United States Patent [19]

Nehls

[11] Patent Number: 4,926,592
[45] Date of Patent: May 22, 1990

[54] BREAKAWAY SIGN POST COUPLING

[75] Inventor: Charles O. Nehls, Allen Park, Mich.

[73] Assignee: Unistrut International Corp., Ann Arbor, Mich.

[21] Appl. No.: 308,552

[22] Filed: Feb. 10, 1989

[51] Int. Cl.$^5$ .......................... E02D 27/42; F16D 1/00
[52] U.S. Cl. .......................................... 52/98; 403/2; 256/13.1; 256/65; 40/607
[58] Field of Search .................... 52/98, 95; 403/2; 40/606, 607, 608, 610; 256/65, 13.1

[56] References Cited

U.S. PATENT DOCUMENTS

| | | | |
|---|---|---|---|
| 3,499,630 | 3/1970 | Dashio . | |
| 3,521,413 | 7/1970 | Scott et al. . | |
| 3,628,296 | 12/1971 | Henry . | |
| 3,630,474 | 12/1971 | Minor . | |
| 3,637,244 | 1/1972 | Strizki . | |
| 3,713,262 | 1/1973 | Jatcke . | |
| 3,967,906 | 1/1976 | Strizki . | |
| 4,021,977 | 5/1977 | Deike . | |
| 4,071,970 | 2/1978 | Strizki . | |
| 4,154,037 | 5/1979 | Anderson . | |
| 4,278,228 | 7/1981 | Rebentisch et al. . | |
| 4,310,979 | 1/1982 | Bloom . | |
| 4,638,608 | 1/1987 | Coy . | |
| 4,737,048 | 4/1988 | Herrstrom | 403/2 |
| 4,793,111 | 12/1988 | Shewchuk | 52/298 |

Primary Examiner—John E. Murtagh
Attorney, Agent, or Firm—Gifford, Groh, Sheridan, Sprinkle and Dolgorukov

[57] ABSTRACT

A breakaway coupling to be interposed between a ground mounting post and a support post carrying a highway sign, barricade or similar highway appurtenance. The coupling has a horizontal plate on a pedestal which attaches to the mounting post and a horizontal plate on a support post mounting member which attaches to the support post. Bolts normally holding the plates together release upon vehicular impact. Use of a novel plate configuration, a gasket and roller cams enhance the structure.

15 Claims, 3 Drawing Sheets

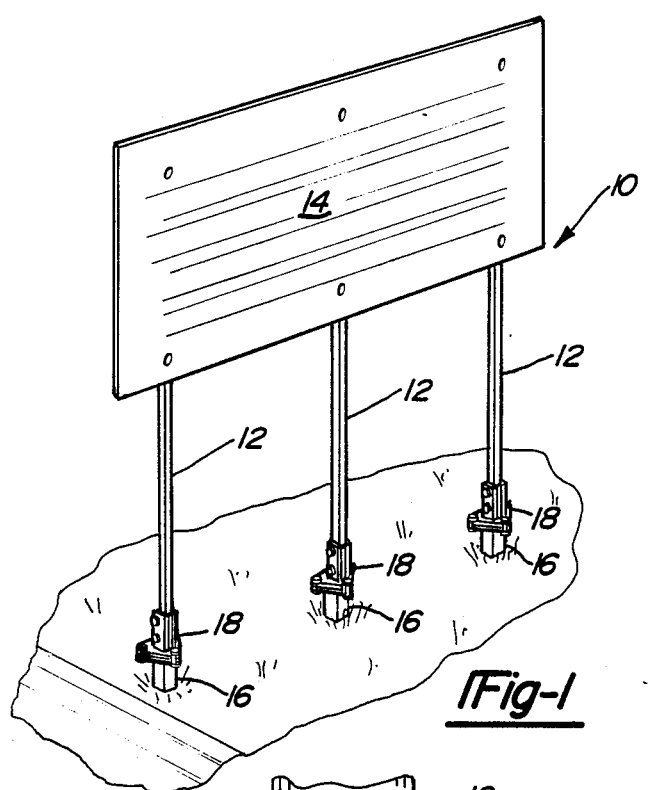
Fig-1
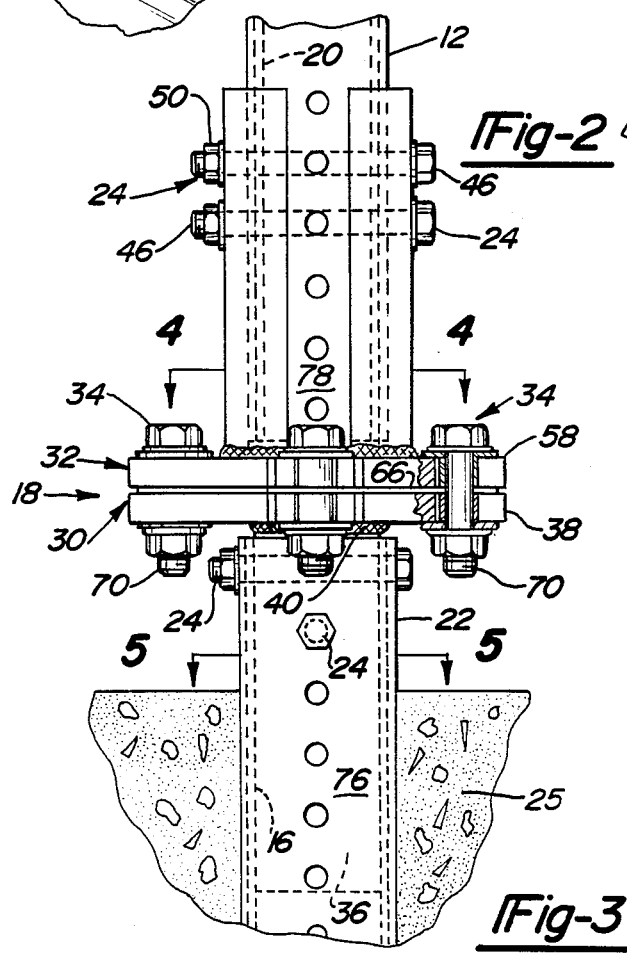
Fig-2
Fig-3
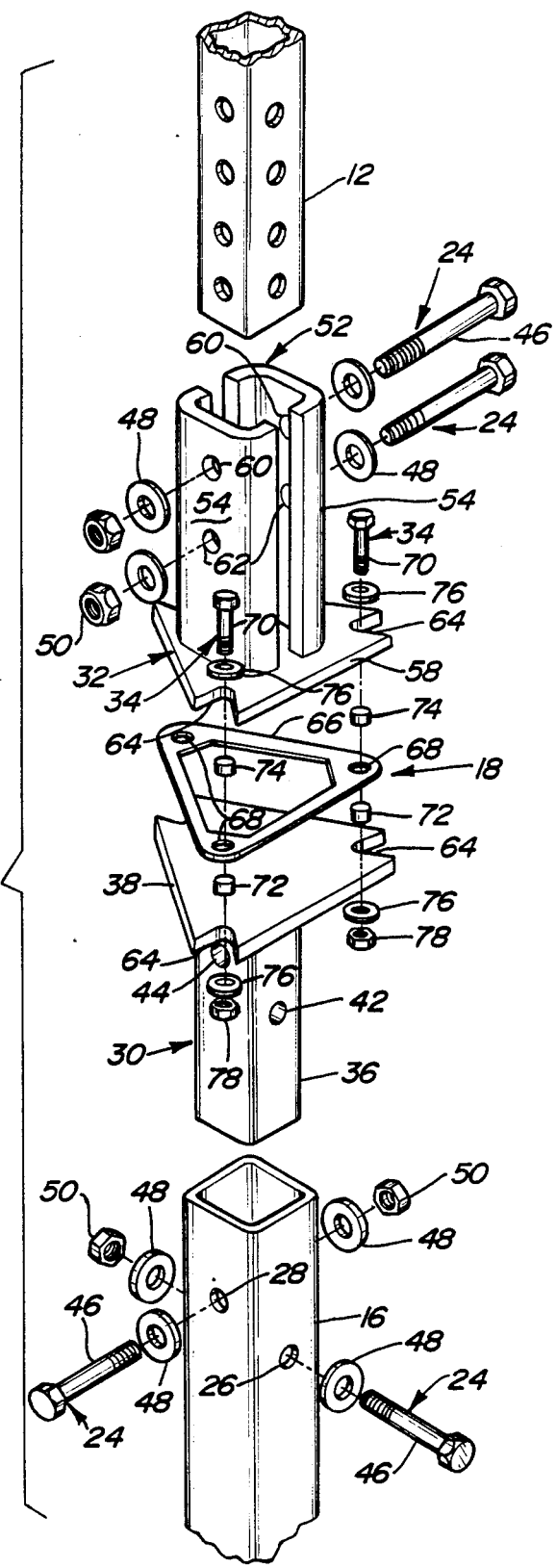

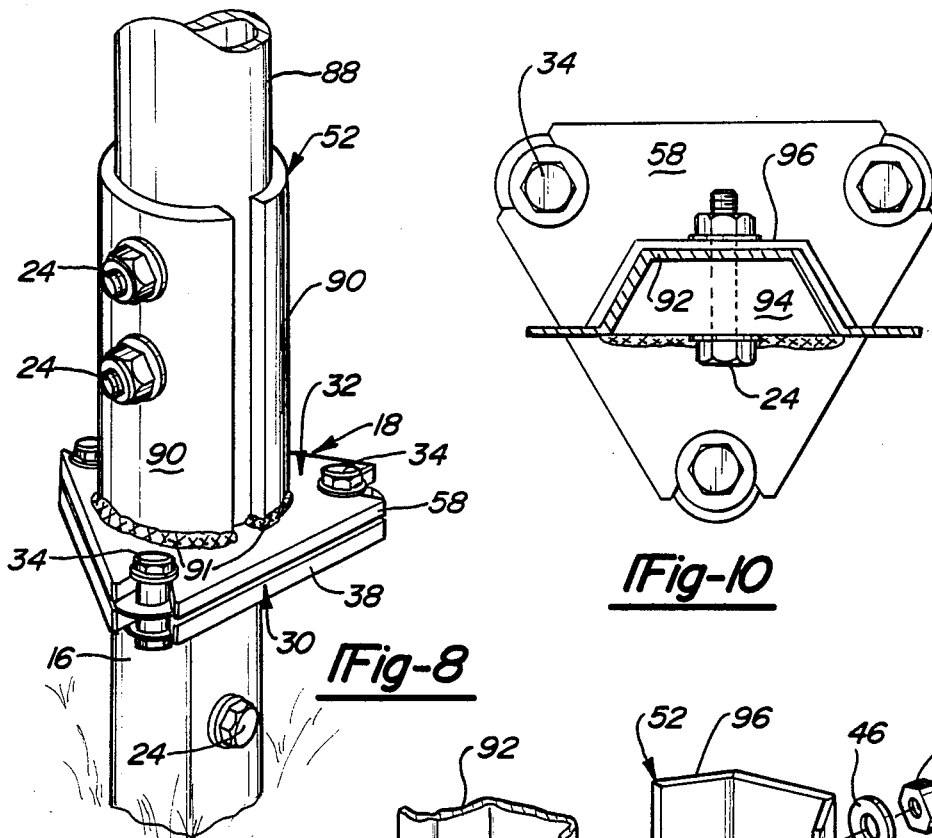
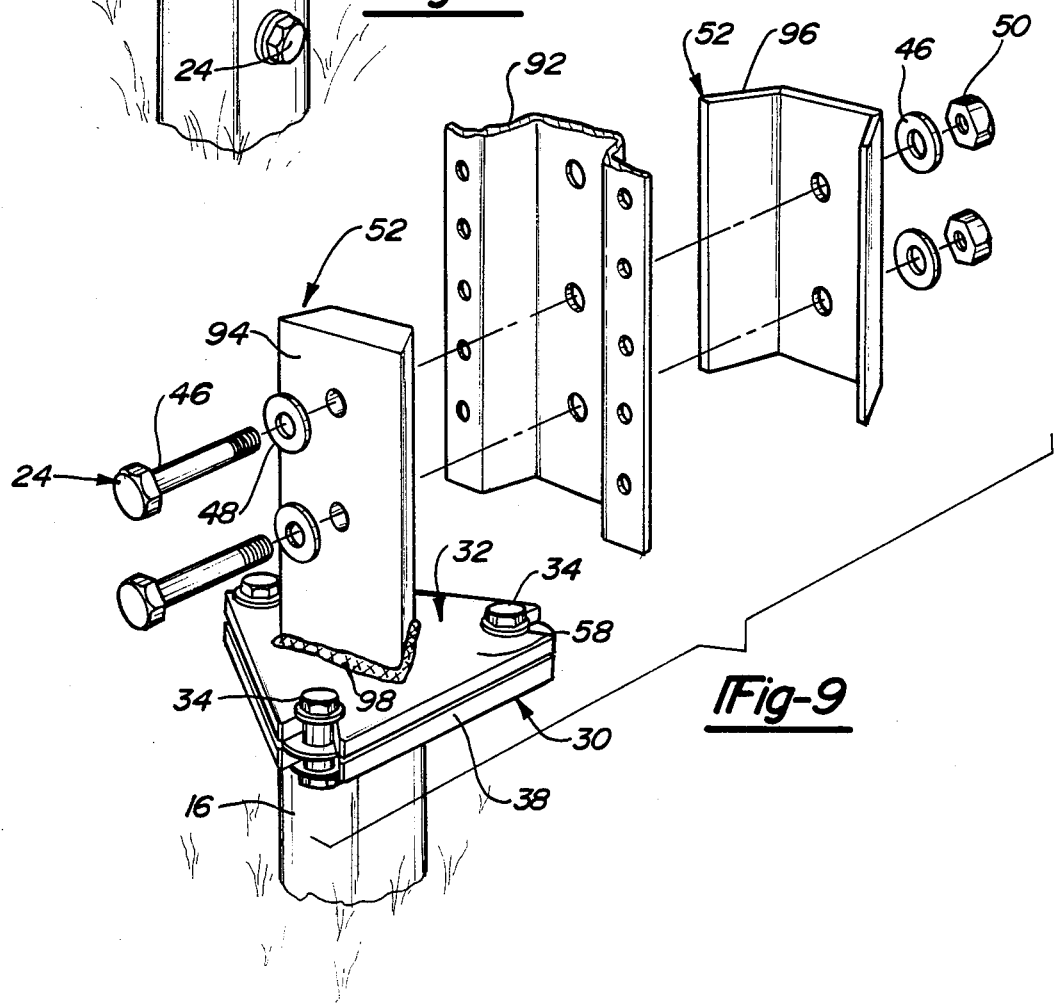

BREAKAWAY SIGN POST COUPLING

BACKGROUND OF THE INVENTION

Field of the Invention

This invention relates to a support structure for highway signs, barricades, flashing lights or other similar roadside appurtenances and, more particularly, to a breakaway coupling to be interposed between a sign or other support post and a ground mounting post which allows severing of the support post and associated structure from the ground mounting post upon vehicle impact.

There are a wide variety of permanent support post structures which are erected along highways to carry signs, warning lights, and the like. There are also a wide variety of temporary support structures which can be driven into the ground or supported on frame members directly on the road bed to provide such items as barriers or temporary signs. Both permanent and temporary posts have been provided with some type of breakaway feature which allows the sign or support post to break off or bend away when hit by a vehicle with a predetermined impact force. In the past, a large number of these devices required shearing of the post itself at a weakened or frangible portion or the shearing of other members such as shear pins or the bending of still other elements. While this type of breakaway feature eliminates certain hazards, unfortunately such resistance to breaking or bending causes the impact to do substantial damage to the vehicle with possible serious injuries to the occupants of the vehicle and often destroys the support structures and signs so that complete replacement is necessary.

In another type of known breakaway device, a fitting is used which includes a horizontal plate attached to a base or ground mounting post and another horizontal plate attached to the support or sign post. The two plates are coupled together by one or more bolts which are deflected out of holding positions to sever the connection without shearing or bending of an element. It is to this type of connection that the present invention is directed. U.S. Pat. No. 4,278,228 shows this type of plate coupling and also shows the shear pin type of coupling.

When an abutting plate type of connection is used where the plates are held together by one or more bolts, the breakaway force required is controlled by the torque applied to the bolts of the assembly. This is true if the bolts pass through slots in the plates to hold the plates in abutment directly or if the bolts hold clamping devices which swing out of the way upon impact. With a higher torque value on the bolts, the structure generally is more stable because the breakaway force increases with bolt torque. With wind loading on signs, for example, this is an important consideration to avoid an accidental breakaway.

However, ultimately the breakaway force to which a structure must be designed is dictated by highway laws. For example, a typical state highway requirement is that a maximum 1500 lb. static load will release or breakaway the sign post. The sign is carried at seven to nine feet above ground level and is carried by one to three posts depending upon sign size. Vehicle impact with the post is at the bumper level of 16 inches above ground. With known prior art structures, breakaway was accomplished with a 1200–1500 lb. vehicle impact when the bolts of the breakaway coupling were torqued to only 20 foot-lbs. This low of a torque leaves very little safety factor for wind loads.

SUMMARY OF THE INVENTION

The present invention is directed to the design of a breakaway coupling located between the support post and ground mounting post which will allow maximum bolt torques for stability with minimum repeatable breakaway forces.

The present invention has accomplished this objective by providing a coupling with an 800 lb. static release at a bolt torque of 40 foot-lbs.

The breakaway coupling of this invention is readily applied to a new installation or to retrofitting an existing installation. The coupling is readily attached to a ground engaging post having a portion extending above ground level and to the support post.

A pedestal mounting member has a longitudinally extending shank for engagement with a mounting post. In the case of permanent installations, the mounting post is typically embedded into the ground or into a concrete footing. A generally triangular shaped base plate is transversely located at one end of the shank. Bolts are provided for firmly attaching the shank of the pedestal mounting member to the mounting post.

A support post mounting member has a longitudinally extending standard for engaging the support or sign post. A generally triangular shaped slip flange congruent with the base plate triangular flange is located at one end of the standard. Bolts are also provided for attaching the standard to the support post. V-shaped notches are supplied at the three corners of the triangular shaped base plate and the triangular shaped slip flange. A friction reducing gasket is interposed between the base plate and slip flange. A bolt and nut connection is inserted in each notch for drawing the plate and flange together with the gasket located between the two.

A pair of cam rollers are located on each of the bolts, one being located between the gasket and the base plate, and the other being located between the gasket and the slip flange. The axial lengths of the cam rollers are less than the thickness of the base plate and slip flange so that they are free to rotate in either direction independent of each other. When the post is subjected to a vehicular impact, the slip flange will slide relative to the base plate while the cam rollers freely rotate in either direction as they contact the plate and flange as the bolts move out of the V-shaped slots. Thus, the bolts are not subjected to a torsional resistance between the two plates and can easily move out to sever the support post mounting member and the attached support post from the pedestal mounting member.

Most often, the ground engaging mounting post and the support or sign post are perforated square metal tubes. However, both a round tube or a hat-shaped channel can be used for either or both the ground mounting post and the support or sign post.

With a square mounting post, the tang of the pedestal mounting member is made in the form of a solid metal block of square cross-section which is inserted into the mounting post. The block is predrilled with two spaced cross holes so that the pedestal mounting member can be firmly attached to the mounting tube by two bolts at right angles to each other passing through the perforated square tubing and the predrilled holes.

If the ground mounting tube is round, the tang of the pedestal mounting member will be made from a solid cylindrical metal block which would be inserted in a like manner into the mounting post and secured with bolts.

If the mounting post is a hat-shaped channel, the tang of the pedestal mounting member would be made in the form of a solid metal block having a trapezoidal cross-sectional shape to engage the inner surface of the hat-shaped channel and clamping plate to engage the outer surface of the channel. In this case, the pedestal mounting member would be attached to the channel by clamping between the block and plate with two parallel bolts.

The longitudinally extending standard of the support post mounting member preferably takes the form of a pair of post engaging members between which the support post is located. Where the support post is a square tube, the pair of post engaging members include opposed C-channels extending from the slip flange for confining engagement with the support post. The C-channels are provided with mounting holes so that the support post can be attached with a pair of parallel bolts. The C-channels can bend inwardly towards each other so that as the bolt and nuts are tightened, the channels will firmly engage the support post. Similarly, if the support post is a round tube, the pair of post engaging members will take the form of arcuate plates. In the case of a hat-shaped channel, the pair of post engaging members will include a solid trapezoidal shaped bar extending from the slip flange which engages the inside surface of the channel, and the other post engaging member will be a cooperating plate member which engages the exterior surface of the channel when the bolt and nut fasteners are tightened.

BRIEF DESCRIPTION OF THE DRAWINGS

Other features and advantages of the present invention will become apparent from the following description of the preferred embodiments of the invention taken together with the following drawings in which:

FIG. 1 is a perspective view of a sign being supported by three sign posts each post engaging a breakaway coupling of this invention which mounts the sign post to an embedded mounting post;

FIG. 2 is an exploded perspective view of a support post, mounting post, and the coupling of this invention showing the details of the coupling itself and its attachment to the support and mounting posts;

FIG. 3 is a front elevational view of the support post, coupling, and mounting post of FIG. 2 shown in its assembled condition;

FIG. 8 is a perspective view of the coupling of this invention being applied to a round support post;

FIG. 9 is an exploded perspective view of the coupling of this invention being applied to a hat-shaped channel support post showing the details of the support post mounting member; and FIG. 10 is a cross-sectional view of the hat-shaped support post mounting member of FIG. 9 as the post is clamped between the mounting member standards.

DETAILED DESCRIPTION OF THE PRESENTLY PREFERRED EMBODIMENTS OF THE INVENTION

Figure 4:
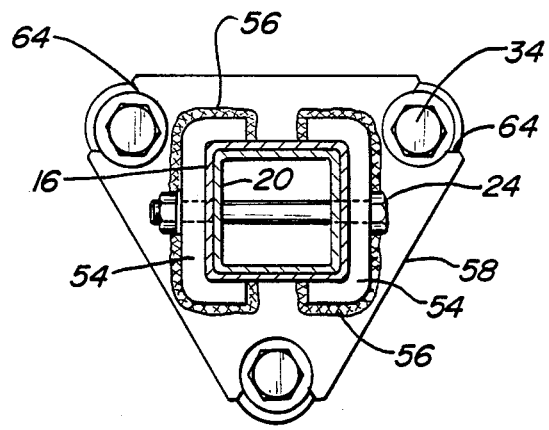
FIG. 4 is a sectional view taken along line 4—4 in FIG. 3 showing the construction of the support post mounting member.

Referring to FIG. 1 of the drawings, breakaway roadside sign assembly 10 is shown as including three equally spaced support posts 12 attached to sign 14 and to three colinear equally spaced ground engaging mounting posts 16 by the breakaway coupling 18 of this invention.

Referring to FIGS. 2 and 3, both the support posts or sign posts 12 and the mounting posts 16 are of tubular configuration having a plurality of openings spaced along the length of each of the members. These tubular members are typically square in cross-section, are made of steel and are commercially available from Unistrut Corporation, Wayne, Michigan, under the trade name TELESPAR. These tubes are made so that tubular sections of different sizes telescope into the next larger size so as to provide a reinforcing support tube 20 telescoped inside of sign post 12 and an outer reinforcing mounting tube 22 embedded into concrete footer 25 into which support tube 16 is inserted. The reinforcing tubes can be omitted and are omitted in FIG. 2 for clarity.

The breakaway coupling 18 of this invention is readily applied to a new installation or to retrofitting an existing installation, and it can be used in a single post installation or a multiple post installation as shown in FIG. 3. Coupling 18 is attached to the ground engaging mounting post 16 by bolt and nut assemblies 24 passing through aligned perforations, or if the mounting post 16 is not perforated, holes 26 and 28 can be drilled as where a retrofit installation is being made, as shown in FIG. 2. The coupling is attached to the support tube by bolt and nut assemblies passing through aligned perforations.

Breakaway coupling 18 includes a pedestal mounting member 30 and a support post mounting member 32 held together by bolt and nut connections 34 as best shown in FIG. 2. The pedestal mounting member 30 has a longitudinally extending solid metal shank 36, which in the case of a square tube mounting post 16 takes the form of a bar with a square cross-section. A triangular shaped base plate 38 is transversely located at one end of the longitudinally extending shank 36 preferably being connected by a weld 40 as shown in FIG. 3. Shank or block 36 has two spaced holes 42 and 44 passing at right angles to each other drilled through the block to receive bolt and nut assemblies 24 passing through holes 26 and 28 in mounting post 16. Bolt and nut assemblies 24 each include a bolt 46, flat washers 48 for placement on each side of mounting post 16, and nut 50. With the cross bolting of the solid metal shank member 36 to the mounting tube 16, a very firm connection is obtained so that there will be no yield or take-up on impact to add to the breakaway force of the coupling itself.

Figure 5:
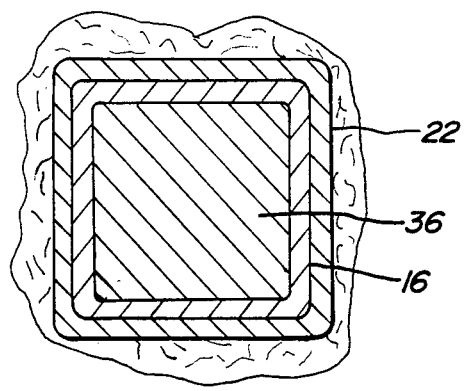
FIG. 5 is a sectional view taken along line 5—5 in FIG. 3 showing the solid shank of the pedestal mounting member in engagement with a mounting tube and also showing a reinforcing tube surrounding the mounting tube.

Support post mounting member 32 has a longitudinally extending standard 52 for engaging the support or sign post 12. In the form shown in FIGS. 2, 3 and 5, the standard includes two C-channels 54 for confining engagement of the support post 12. The C-channels are welded as shown at 56 in FIG. 4 to a triangular shaped slip flange 58. Each C-shaped channel member 54 has aligned upper and lower mounting holes 60 and 62 for receiving bolts 46 of bolt and nut assemblies 24. When the bolt and nut assemblies are tightened, the channels 54 will be drawn towards each other to assure a firm attachment to the support post 12. Like the attachment of the pedestal mounting post 36 to the mounting post 16, it is important to have a firm attachment of the support post 12 to the post mounting structure to eliminate any yield or take up that would occur upon impact which would add to the breakaway force of the coupling.

The triangular slip plate 58 of support post mounting member 32 and triangular base plate 38 of pedestal mounting member 30 have the same configuration or are congruent to each other with both having V-shaped notches 64 located at each of their three corners. A friction reducing gasket 66 is placed between base plate 38 and slip flange 58. The gasket can be made of any suitable friction reducing material such as Teflon. The gasket has a triangular periphery with holes 68 at each of its three corners to closely receive bolt 70 of bolt and nut assemblies 34. As the bolt and nut assemblies 34 are tightened, they draw the base plate 38 and slip flange 58 together with the gasket located between the two.

A pair of cam rollers 72 and 74 are located on each of the bolts 70. Plate cam roller 72 is located between the gasket 66 and the base plate 38 and flange cam roller 74 is located between the gasket 66 and slip flange 58. The axial length of plate cam rollers 72 is less than the thickness of base plate 38, and the axial length of flange cam rollers 74 is less than the thickness of slip flange 58. Gasket 66 overlies the adjacent ends of the plate cam rollers and flange cam rollers keeping them separate so that the cam rollers are free to rotate in either direction independent of each other.

The breakaway coupling 18 is assembled by passing the bolt 70 of bolt and nut assembly 34 through a flat washer 76, notch 64 of slip flange 58, flange cam roller 74, hole 68 in gasket 66, plate cam roller 72, notch 64 in base plate 38, another flat washer 76, and nut 78 at each of the three corners of the triangular shaped base plate and slip flange as shown in FIG. 2. The rearward bolt and nut assembly 34 in FIG. 2 has been omitted for clarity. Each of the nut and bolt assemblies 34 is tightened to a predetermined torque to establish the desired breakaway force. In a typical installation, the mounting post 16 can be a 2¼ inch square steel tube; the sign post can be a 2 inch square steel tube; the base plate 38 and slip flange 58 can be ½ inch thick plates; and the bolt and nut assemblies 34 can use ½ inch bolts. Under these conditions, the bolt and nut assemblies can be tightened to a torque of 40 foot-lbs. to provide a high stability under any wind load conditions with only an 800 lb. static release or breakaway force required to sever the slip flange and sign post from the pedestal mounting base of the coupling.

When the post is subjected to a vehicular impact, the slip flange will slide relative to the base plate while the cam rollers freely rotate in either direction as they contact plate 38 and flange 58 in their respective notches 64 as the bolt and nut assemblies 34 move out of the V-shaped slots.

Figure 6:
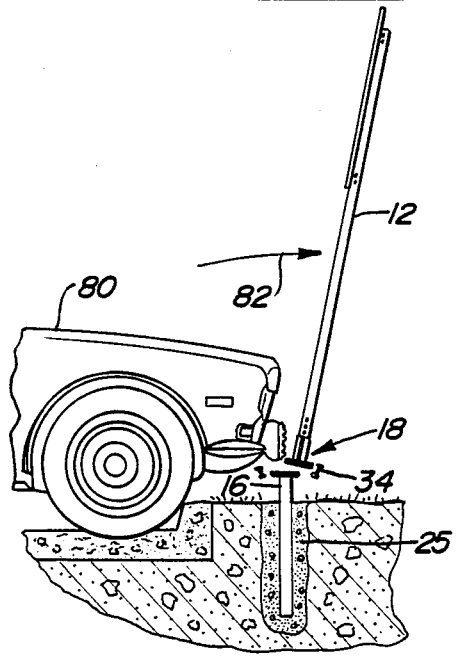
FIG. 6 is an illustration of a sign post being severed from an embedded mounting post after impact by a vehicle.

FIG. 6 shows the impact of a vehicle 80 with a sign post 12. Typically, impact occurs at a standard bumper height of 16 inches above ground which would be about one foot above the plate-flange center of coupling 18. The impact moves the support post in the direction of arrow 82 separating the coupling as shown.

Figure 7:
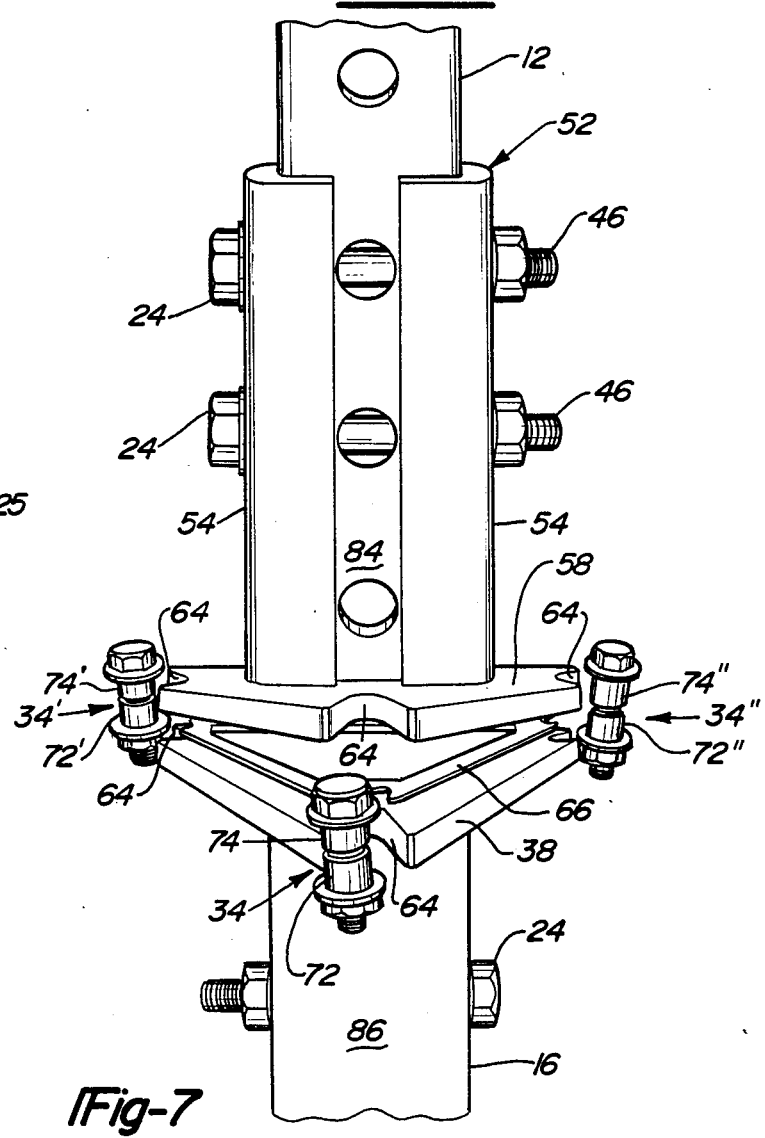
FIG. 7 is a view similar to FIG. 2 but showing the coupling of this invention in perspective in the process of being severed immediately after impact.

FIG. 7 shows the coupling 18 an instant after impact as the bolt and nut assemblies 34 breakaway from gasket 66. Impact is directly against the flat face 84 of support post 12 which has been aligned along with flat face 86 of mounting post 16 to face the traffic flow direction. Rearward flange cam rollers 74', 74" would have rotated in one direction, typically clockwise, as they rolled in contact with the rearward portion of notches 64 in the slip flange 58. Plate cam rollers 72', 72" would have rotated in the other direction, typically counterclockwise, as they rolled in contact with the forward portion of notches 64 in base plate 38. Forward bolt and nut assembly 34 could drop out without any contact of the cam rollers 72 and 74 with notch 64. The cam rollers thus prevent reverse or opposite direction torque forces from being applied to the bolt 70 as the coupling disengages with a resultant uniform, predetermined low breakaway force. The triangular configuration of the coupling base plate and slip flange produces a consistent uniform breakaway force, regardless of the direction in which the support post is impacted.

FIG. 8 shows the installation of breakaway coupling 18 to a square mounting post 16 and a round support post 88. The longitudinally extending standard 52 of support post mounting member 32 takes the form of a pair of opposed arcuate plates 90 which are welded at 91 to slip flange 58. Bolt and nut assemblies 24 pass through two parallel holes in both plates 90 and support tube 88 drawing the plates 90 inwardly in intimate contact with the post 88 in a manner similar to the attachment of a square support post 12 to C-shaped standard members 54 as shown in FIGS. 2 and 3. If the mounting post 16 is a round tube, the square cross-section longitudinally extending shank 36 best seen in FIG. 2 would be a solid cylindrical bar to accommodate the mounting of the coupling 18 to the mounting post in a manner similar to that shown in FIG. 2. Alternatively, the longitudinally extending shank 36 of the pedestal mounting member 32 could take the form of standard 52 utilizing arcuate mounting plates 90. In this case, the bolt and nut assemblies 24 would be parallel to each other instead of at right angles as shown in FIG. 2.

FIGS. 9 and 10 show the mounting of coupling 18 to a hat-shaped support channel 92 by longitudinally extending standard 52 in the form of solid mounting bar 94 having a trapezoidal cross-section to conform with the interior of channel 92 and a cooperating clamping plate 96 having three surfaces to conform with the exterior of channel 92. Channel mounting bar 94 is welded at 98 to slip flange 58. Channel shaped support post 92 is firmly mounted between clamping plate 96 and mounting bar 94 by parallel bolt and nut assemblies 24. If the mounting post is also a hat-shaped channel, the shank 36 of the pedestal mounting member 30 can take the same form as standard 52 including a mounting block 94 with a trapezoidal cross-section and a clamping plate 96.

It will be readily apparent that the breakaway coupling of the present invention can be applied to a mounting post of any shape by supplying the shank of the pedestal mounting member with the proper configuration. Likewise, the coupling can be used with a support post of any configuration by modification of the configuration of the standard of the support post mounting member.

The embodiments of the invention in which an exclusive property or privilege is claimed are defined as follows:

1. A breakaway coupling for a roadside support post to be used in conjunction with a ground engaging mounting post having a portion extending above ground level comprising, in combination:
   a pedestal mounting member having a longitudinally extending shank for engagement with said mounting post, and a generally triangular shaped base plate transversely located at one end of said shank;
   means for firmly attaching said shank to said mounting post;
   a support post mounting member having a longitudinally extending standard for engaging said support post and a generally triangular shaped slip flange congruent to said base plate transversely located at one end of said standard;
   means for firmly attaching said standard to said support post;
   generally V-shaped notches at the corners of said triangular shaped base plate and triangular shaped slip flange;
   a friction reducing gasket located between said base plate and said slip flange;
   a bolt and nut connection inserted in each notch drawing said plate and flange together with said gasket therebetween; and
   a pair of cam rollers on each bolt, one located between said gasket and said base plate, and the other located between said gasket and said slip flange;
   whereby when said post is subjected to a vehicular impact, said slip flange will slide relative to said base plate severing said support post mounting member and support post from the base plate of said pedestal mounting member.

2. The coupling according to claim 1 wherein said mounting post is a square tube and the shank of said pedestal mounting member is a metal block having a square cross-section which is received in said mounting post in sliding engagement.

3. The coupling according to claim 2 wherein said means for firmly attaching the shank of the pedestal mounting member to the mounting post includes a bolt and nut assembly extending through aligned holes in said square mounting post tube and said metal block.

4. The coupling according to claim 3 wherein the means for firmly attaching the shank of the pedestal mounting member to the mounting post includes a spaced pair of bolt and nut assemblies passing through the block and mounting tube at right angles to each other.

5. The coupling according to claim 1 wherein each bolt of said bolt and nut connection passes through a hole in said gasket and each cam roller has an axial length less than the thickness of the one of the base plate and slip flange with respect to which it is located;
   whereby upon impact of said post said cam rollers are free to rotate as they are forced out of said notches on said bolt and nut connection.

6. The coupling according to claim 1 wherein said longitudinally extending standard includes a pair of post engaging members between which said support post is located.

7. The coupling according to claim 6 wherein the means for firmly attaching said standard to said support post includes a bolt and nut assembly extending through aligned holes in said pair of post engaging members and said support post.

8. The coupling according to claim 7 wherein said support post is a square tube and said pair of post engaging members include a pair of opposed C-channels extending from said slip flange for confining engagement with said support post.

9. The coupling according to claim 8 wherein said C-channels can be drawn toward each other as said bolt and nut assembly is tightened to assure firm attachment to said support post.

10. A coupling according to claim 7 wherein said support post is a round tube and said pair of post engaging members include a pair of opposed arcuate plates extending from said slip flange for confining engagement with said post.

11. The coupling according to claim 10 wherein said arcuate plates can be drawn toward each other as said bolt and nut assembly is tightened to assure firm attachment to said support post.

12. The coupling according to claim 7 wherein said support post is a hat-shaped channel and said pair of post engaging members include a solid trapezoidal shaped bar extending from said slip flange which engages the inside surfaces of said channel and a cooperating plate member which engages the exterior surfaces of said channel when said bolt and nut assembly is tightened.

13. A breakaway coupling for a roadside sign post to be used in conjunction with an embedded mounting post having a portion extending above ground level comprising, in combination:
   a pedestal mounting member having a longitudinally extending shank for engagement with said mounting post, and a generally triangular shaped base plate transversely located at one end of said shank, said plate having a V-shaped notch at each of its three corners;
   means for firmly attaching said shank to said mounting post;
   a sign post mounting member having a longitudinally extending standard for engaging a sign post and a generally triangular shaped slip flange having a V-shaped notch at each of its three corners, said slip flange being congruent to said base plate and transversely located at one end of said standard;
   means for firmly attaching said standard to said sign post;
   a friction reducing gasket located between said base plate and said slip flange, said gasket having a peripheral portion overlying said V-shaped notches;
   a bolt inserted into the plate and flange notch at each corner and passing through a hole in the peripheral portion of said gasket, and a nut on each of said bolts for drawing said plate and flange together with said gasket therebetween; and
   a plate cam roller located on each bolt between said gasket and said base plate, said plate cam roller having an axial length less than the thickness of said base plate, and a flange cam roller on each bolt between said gasket and said slip flange, said flange cam roller having an axial length less than the thickness of said slip flange, said gasket separating said plate cam rollers from said flange cam rollers;
   whereby when said post is subjected to vehicular impact, said slip flange will slide relative to said base plate while the cam rollers are free to rotate in either direction when they contact the plate and flange as the bolts move out of the V-shaped slots to sever the sign post mounting member and attached sign post from the pedestal mounting member.

14. A breakaway roadside sign assembly having a plurality of sign posts attached to a sign and a plurality of embedded mounting posts colinear with said sign posts, each of said sign posts being joined to a colinear mounting post by the coupling of claim 13.

15. The sign assembly according to claim 14 wherein a first sign post is attached at a mid-point of the sign, and second and third sign posts are attached adjacent to the sides of the sign equidistant from the first sign post, and said first, second and third sign posts are joined to colinear first, second and third mounting posts by said couplings.

* * * * *